US011752621B2

(12) United States Patent
Koga (10) Patent No.: US 11,752,621 B2
(45) Date of Patent: Sep. 12, 2023

(54) ARTICLE TRANSPORT SYSTEM HAVING PLURALITY OF MOVABLE PARTS

(71) Applicant: Fanuc Corporation, Yamanashi (JP)

(72) Inventor: Kentaro Koga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 407 days.

(21) Appl. No.: 16/924,493

(22) Filed: Jul. 9, 2020

(65) Prior Publication Data

US 2021/0031360 A1 Feb. 4, 2021

(30) Foreign Application Priority Data

Jul. 31, 2019 (JP) .................................. 2019-141663

(51) Int. Cl.
*B25J 9/00* (2006.01)
*B25J 9/16* (2006.01)
*B65G 47/90* (2006.01)

(52) U.S. Cl.
CPC ........... *B25J 9/0093* (2013.01); *B25J 9/0084* (2013.01); *B25J 9/1664* (2013.01); *B25J 9/1697* (2013.01); *B65G 47/905* (2013.01); *B65G 2203/0233* (2013.01); *B65G 2203/0291* (2013.01); *G05B 2219/39102* (2013.01)

(58) Field of Classification Search
CPC ...... B25J 9/0093; B25J 9/0084; B25J 9/1664; B25J 9/1697; B25J 9/161; B25J 19/04; B65G 47/905; B65G 2203/0233; B65G 2203/0291; B65G 2203/041; B65G 2203/044; B65G 61/00; G05B 2219/39102; G05B 2219/40007
See application file for complete search history.

(56) References Cited

U.S. PATENT DOCUMENTS

| 4,575,637 A | * | 3/1986 | Sullivan, Jr. | ........... B25J 9/1697 356/615 |
| 4,835,450 A | * | 5/1989 | Suzuki | ................... G06T 1/0014 414/730 |

(Continued)

FOREIGN PATENT DOCUMENTS

| CN | 109623876 B | * | 7/2022 | .......... B25J 19/0095 |
| EP | 3525992 B1 | * | 9/2022 | ........... A47L 9/2852 |

(Continued)

*Primary Examiner* — Thomas Randazzo
(74) *Attorney, Agent, or Firm* — RatnerPrestia (57) ABSTRACT

An article transport system capable of averaging an amount of movement of each movable part when transporting articles. The article transport system includes a sensor for detecting a three-dimensional position of each of a plurality of workpieces, a plurality of robots each having a movable part for conveying the workpieces to predetermined plurality of conveying destinations, a control section for controlling the robots, a movement amount calculation section for calculating a movement amount of each of the movable parts when each workpiece is conveyed by one of the robots based on a three-dimensional position of each workpiece, and a distribution determination section for determining a distribution pattern regarding which robot arm is used for conveyance of each workpiece so that a difference between the movement amounts of the movable parts is minimal or less than a predetermined value.

8 Claims, 9 Drawing Sheets

(56) References Cited

U.S. PATENT DOCUMENTS

| | | | | |
|---|---|---|---|---|
| 4,853,771 | A * | 8/1989 | Witriol | G05B 19/4083 |
| | | | | 250/483.1 |
| 8,074,431 | B1 * | 12/2011 | Pierson | B65G 61/00 |
| | | | | 53/529 |
| 10,377,581 | B2 | 8/2019 | Ooba | |
| 11,254,002 | B1 * | 2/2022 | Ebrahimi Afrouzi | G06N 3/084 |
| 11,320,828 | B1 * | 5/2022 | Ebrahimi Afrouzi | |
| | | | | G05D 1/0246 |
| 11,383,395 | B2 * | 7/2022 | Simkins | B25J 18/00 |
| 11,440,195 | B2 * | 9/2022 | Lisso | G06Q 10/0832 |
| 11,453,123 | B2 * | 9/2022 | Peng | B25J 9/1676 |
| 2012/0165972 | A1 * | 6/2012 | Wappling | B25J 9/1687 |
| | | | | 700/213 |
| 2012/0217129 | A1 * | 8/2012 | Tsutsumi | B25J 9/0093 |
| | | | | 198/339.1 |
| 2013/0151007 | A1 * | 6/2013 | Valpola | B25J 9/00 |
| | | | | 901/9 |
| 2015/0127148 | A1 | 5/2015 | Koyanagi et al. | |
| 2016/0068352 | A1 * | 3/2016 | Oda | G06T 7/13 |
| | | | | 901/47 |
| 2018/0117766 | A1 * | 5/2018 | Atohira | B25J 9/1671 |
| 2018/0333857 | A1 * | 11/2018 | Ando | B25J 9/1694 |
| 2021/0369359 | A1 * | 12/2021 | Blanckaert | A61B 34/35 |
| 2021/0370509 | A1 * | 12/2021 | Pivac | G05B 19/4155 |
| 2022/0019939 | A1 * | 1/2022 | Hazan | G06N 20/00 |
| 2022/0032450 | A1 * | 2/2022 | Kim | G05B 13/0265 |
| 2022/0041379 | A1 * | 2/2022 | Zatopek | B07C 5/10 |
| 2022/0088783 | A1 * | 3/2022 | Shao | B25J 9/0093 |
| 2022/0088795 | A1 * | 3/2022 | Aoki | B25J 9/1697 |
| 2022/0089386 | A1 * | 3/2022 | Zhang | B65G 65/005 |
| 2022/0112034 | A1 * | 4/2022 | Dwivedi | B65G 47/31 |
| 2022/0193904 | A1 * | 6/2022 | Rácz | B25J 9/1664 |

FOREIGN PATENT DOCUMENTS

| | | |
|---|---|---|
| JP | 10329069 A | 12/1998 |
| JP | 2013000861 A | 1/2013 |
| JP | 2014087913 A | 5/2014 |
| JP | 2018122370 A | 8/2018 |
| WO | 2014013607 A1 | 1/2014 |
| WO | 2014013609 A1 | 1/2014 |

* cited by examiner

ARTICLE TRANSPORT SYSTEM HAVING PLURALITY OF MOVABLE PARTS

CROSS-REFERENCE TO RELATED APPLICATIONS

This application is a new U.S. Patent Application that claims benefit of Japanese Patent Application No. 2019-141663, dated Jul. 31, 2019, the disclosure of which is incorporated herein by reference in its entirety for all purposes.

BACKGROUND OF THE INVENTION

1. Field of the Invention

The present invention relates to an article transport system having a plurality of movable parts.

2. Description of the Related Art

A pick-up machine is well known, in which a plurality of articles randomly arranged in a container are captured by a camera, the position of each article is detected by image processing of an obtained image, and a pick-up operation by a robot is performed based on the detected position (e.g., see JP 2014-087913 A).

A system is also well known, in which a plurality of articles conveyed by a conveyor are captured by a camera, and the positions of the articles are detected by image processing of obtained images, and the articles are transferred by a plurality of robots disposed on the downstream side of the camera based on the detected positions (e.g., see WO 2014/013607 A).

Furthermore, a transfer system is well known, in which, when picking a workpiece using a transfer robot having two arms, a turning direction and a turning angle are calculated for each arm, the arm having the minimum turning amount is selected, and the selected arm is used for picking the workpiece (e.g., see JP H10-329069 A).

In an application or system in which a plurality of articles are conveyed using a robot having a plurality of movable parts, it is often the case to calculate and determine to the movable part by which each article is conveyed for the purpose of completing conveyance of all articles in as short a time as possible. However, in such a case, the load concentrates on a specific movable part, and the maintenance frequency of only the specific movable part may increase. From the viewpoint of management and maintenance of the transport system as a whole, it is desirable that the maintenance frequency of each movable part be averaged to the greatest degree possible.

SUMMARY OF INVENTION

One aspect of the present disclosure provides an article transport system comprising a sensor for detecting a three-dimensional position of each of a plurality of articles, a robot having a plurality of movable parts for conveying the articles to a predetermined conveying position, a control section for controlling the robot, a movement amount calculation section for calculating a movement amount of each of the movable parts when each of the plurality of articles is conveyed by any one of the plurality of movable parts based on a three-dimensional position of each of the articles, and a distribution determination section for determining a distribution pattern regarding which of the plurality of movable parts is used to convey each of the plurality of articles so that a difference between movement amounts of the movable parts is minimal or less than a predetermined value.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

First Embodiment

Figure 1:
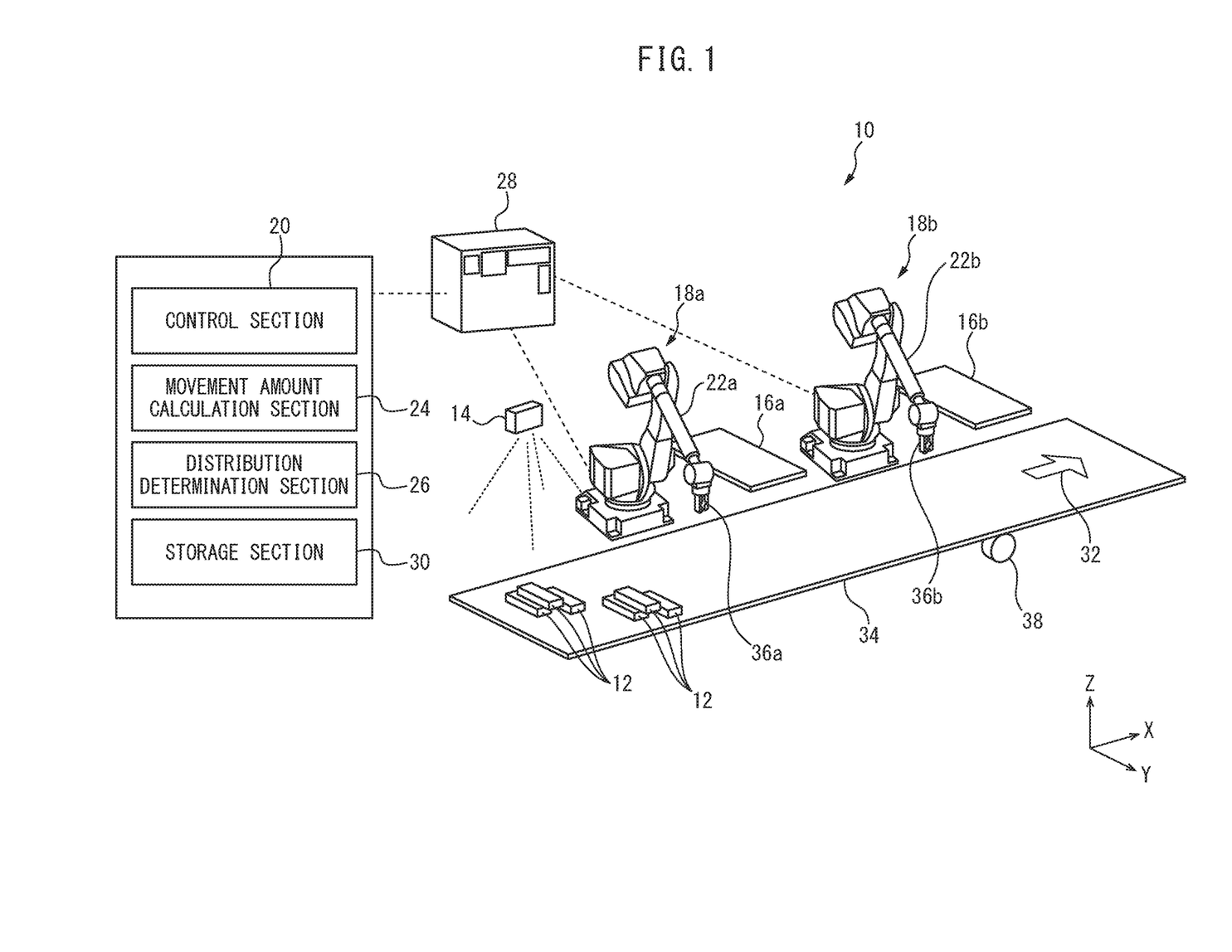
FIG. 1 is a diagram showing a configuration of an article transport system according to a first embodiment.

FIG. 1 is a diagram showing an example of a basic configuration of an article transport system 10 according to a first embodiment. The article transport system 10 has a sensor 14 configured to detect the three-dimensional position of each of a plurality of articles (workpieces) 12, robots (two robots in this case) 18a and 18b having a plurality of movable parts configured to transport the workpieces 12 to predetermined transport destinations (pallets, etc., in this case) 16a and 16b, respectively, a control section 20 configured to control the robots 18a and 18b, a movement amount calculation section 24 configured to calculate a movement amount of each movable part (robot arms 22a and 22b in this case) of the robots 18a and 18b when transporting each of the plurality of workpieces 12 by one of the robots 18a and 18b, based on the three-dimensional position of each workpiece 12, and a distribution determination section 26 configured to determine a distribution pattern regarding which of the robot arms 22a and 22b is used to convey each workpiece 12 so that the difference between the movement amount of the movable part 22a and the movement amount of the movable part 22b is minimal or less than a predetermined value.

The control section 20, the movement amount calculation section 24, and the distribution determination section 26 are realized by, for example, an arithmetic processing device (processor) such as a CPU, and can be accommodated in a robot controller 28. The robot controller 28 may further include a storage section 30 such as a memory capable of storing various data. In addition, at least some of these components may be provided in a computer, such as a personal computer, separate from the robot controller 28.

In the first embodiment, a conveyor 34 such as a belt conveyor is provided for sequentially transporting a plurality of workpieces 12 in a predetermined conveying direction (shown by an arrow 32 in the illustrated example) at a predetermined conveying velocity. As the sensor 14, for example, a general-purpose three-dimensional vision sensor can be used, and the sensor 14 can detect the three-dimensional position and posture of the workpiece in a predetermined measurement area. Examples of three-dimensional vision sensors include a stereo vision sensor, a structured light sensor, a laser triangulation sensor, and a time-of-flight (TOF) sensor. Specific examples of the sensor 14 other than a three-dimensional vision sensor include a combination of a two-dimensional camera and a distance sensor which can, in this case, detect the three-dimensional position and posture of the measurement object by measuring and acquiring information regarding the X and Y coordinates of the measurement object with the two-dimensional camera, and measuring and acquiring information regarding the Z coordinate of the measurement object with the distance sensor.

The robot 18a is, for example, a six-axis articulated robot, and has a hand 36a which is attached to the tip of the arm 22a and capable of holding the workpiece 12. Based on the distribution pattern to be described later, the robot 13a can grasp workpieces 12 conveyed by the conveyor 34 sequentially (one-by-one in the illustrated example) and convey them to the conveying position 16a. Similarly, the robot 18b is, for example, a six-axis articulated robot, and has a hand 36b which is attached to the tip of the arm 22b and capable of holding the workpiece 12. Based on the distribution pattern to be described later, the robot 18b can also grasp workpieces 12 conveyed by the conveyor 34 sequentially (one-by-one in the illustrated example) and convey them to the conveying position 16b.

The article transport system 10 according to the first embodiment includes, but is not limited to, two robots 18a and 18b each having a movable part (arm). For example, the number of robots each having a movable part may be three or more, and each robot is not limited to a six-axis articulated robot as long as it can carry workpieces 12. Further, substantially one robot may have a plurality of movable parts (arms), and each movable part may be capable of performing workpiece holding and conveying operations independently. Herein, any of these aspects is encompassed by "a robot having a plurality of movable parts."

Hereinafter, the flow of processes in the article transport system 10 will be described. Here, as shown in FIG. 1, it is assumed that the workpieces 12 are conveyed by the conveyor 34 in a state in which two workpieces 12 are stacked.

Figure 2:
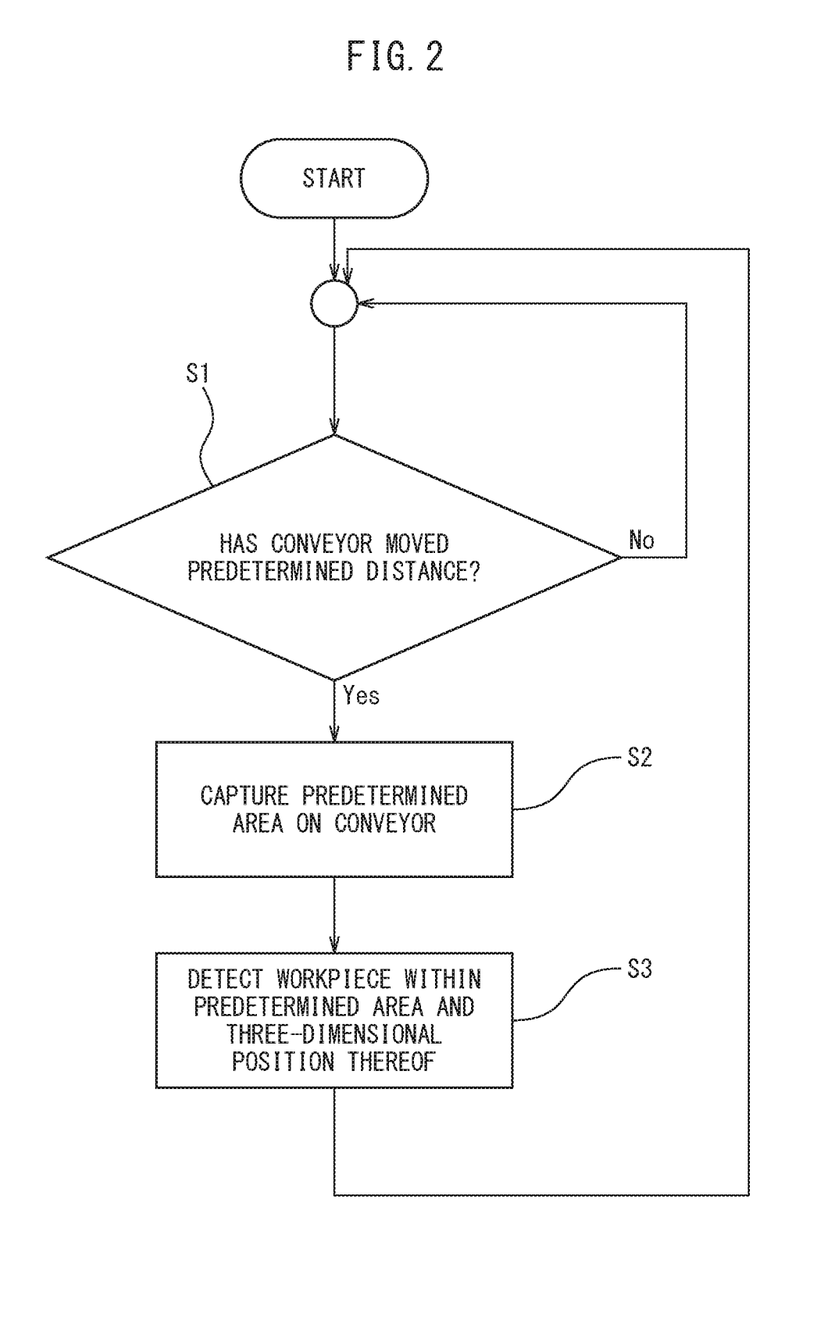
FIG. 2 is a flowchart snowing workpiece detection process of the first embodiment.

FIG. 2 is a flowchart showing an example of a detection process by the sensor 14. First, using an encoder 38, etc., provided on the conveyor 34, the controller 28, etc., determines whether the conveyor 34 has moved a predetermined distance (more specifically, whether the feed amount of the conveyance portion (a belt, etc.) of the conveyor 34 from the previous detection has reached a predetermined distance) (step S1), and when the conveyor 34 has moved the predetermined distance, the sensor 14 captures an image of a predetermined area of the conveyor 34 (step S2). This predetermined area is usually set as an area on the conveyor 34 at a certain distance upstream of the installation position of the most upstream robot (here, the robot 18a), and the predetermined distance can be set based on, for example, the performance of the robot and the execution velocity of the process to be described later.

In the next step S3, using the controller of the sensor 14 or an image processor (not illustrated), etc., image processing, etc., of the image acquired in step S2 is performed, the presence or absence of the workpiece 12 in the predetermined area on the conveyor 34 is detected, and when a workpiece 12 is present in the predetermined area, the three-dimensional position thereof is detected. At this time, the posture of the workpiece 12 may be further detected in order to facilitate gripping of the workpiece by the robot. The processes of steps S1 to S3 are repeated at predetermined intervals. Information (data) regarding the three-dimensional position, etc., of the workpiece 12 detected by the sensor 14 is sent to the controller 28 and is used in the process of step S4 to be described later.

Figure 3:
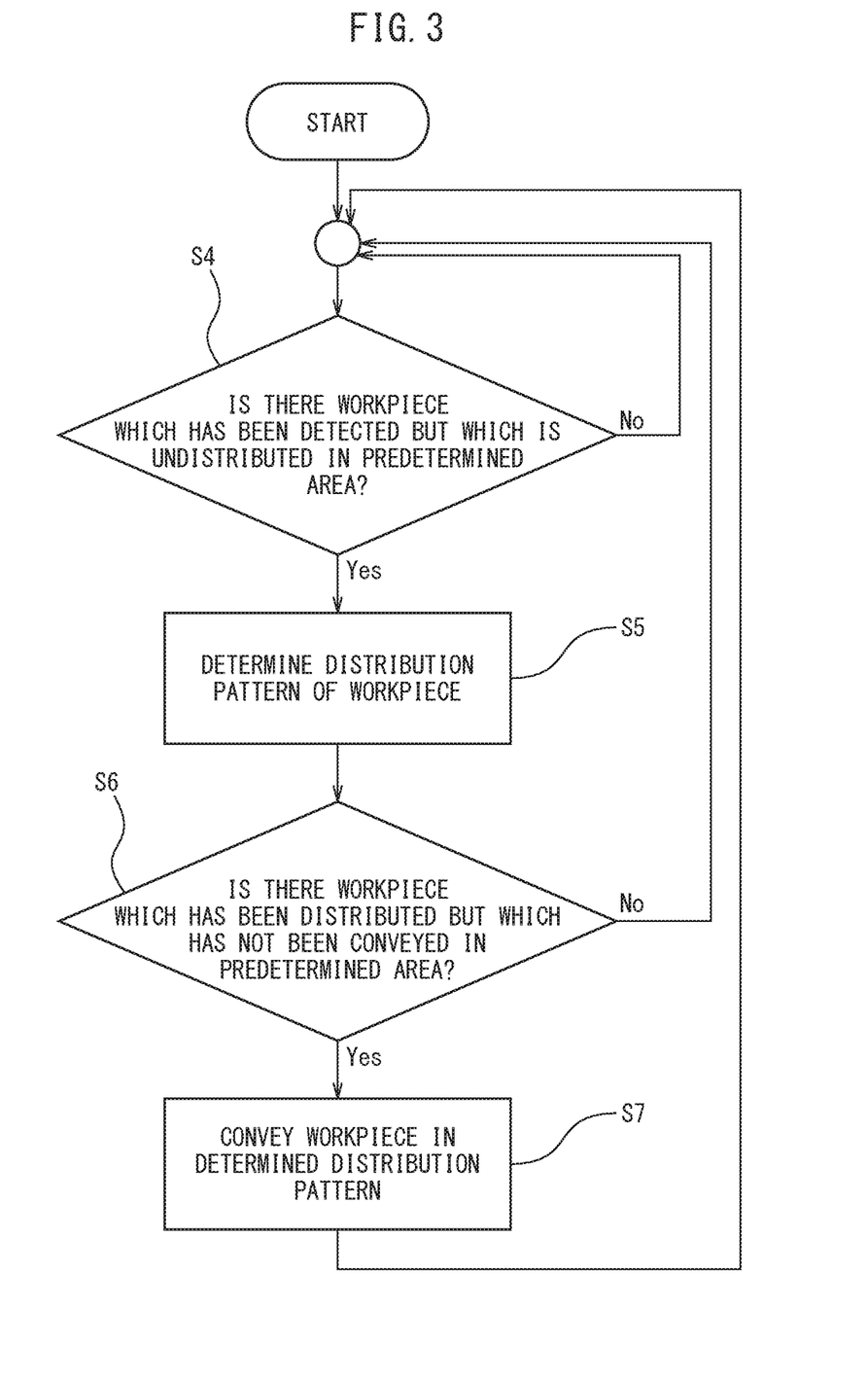
FIG. 3 is a flowchart showing distribution and conveyance process of the first, embodiment.

FIG. 3 is a flowchart showing an example of process when conveying the workpiece 12 by the robot 18a or 18b using the detection result of the sensor 14. First, in step S4, it is determined whether or not a workpiece whose three-dimensional position, etc., has been detected and whose distribution process to be described later has not been performed is present in the predetermined area (here, substantially equivalent to the detection range of the sensor 14), and if such a workpiece is present, the process proceeds to step S5.

In step S5, the distribution determination section 26 determines a distribution pattern indicating which robot is to convey the workpiece. Details thereof will be described below with reference to the flowchart of FIG. 4. Here, the number of double-stacked workpieces is set as n (one in the upper stage and two in the bottom stage for a total of three in the example of FIG. 1), and the range of presence of workpieces which can be grasped and transported by the robot 18a on the upstream side is set as Xa to Xb. Note Xa and Xb are coordinates of the direction (X direction) along the conveying direction 32 of the conveyor 34.

Figure 4:
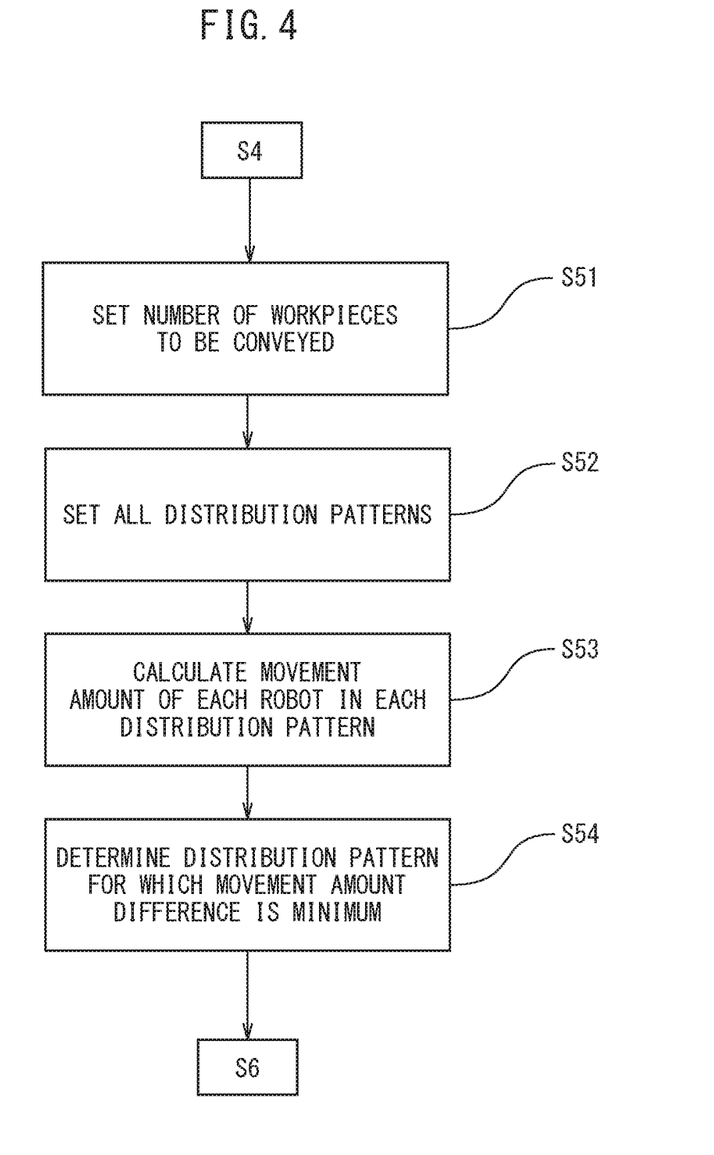
FIG. 4 is a flowchart showing distribution pattern determination process of the flowchart of FIG. 3.

First, in step S51, the number n of workpieces to be distributed is set based on the detection data from the sensor 14. Next, in step S52, the above-described distribution determination section 26, etc., creates and sets a plurality (preferably all) of combinations (distribution patterns) where the robot 18a or 18b conveys each of the n workpieces 12. In this embodiment, since the number of workpieces is n and the number of movable parts (robots) is two, the distribution of workpieces can be up to $2^n$, but combinations in which the robot 18a on the upstream side transports the workpieces on the lower stage and the robot 18b on the downstream side transports the workpieces on the upper stage that are at least partially stacked on the workpieces on the lower stage are excluded.

In the next step S53, for each of the combinations set in step S52, the movement amount of the movable part 22a of the robot 18a and the movement amount of the movable part 22b of the robot 19b are calculated. Hereinafter, a specific example thereof will be described.

Figure 5:
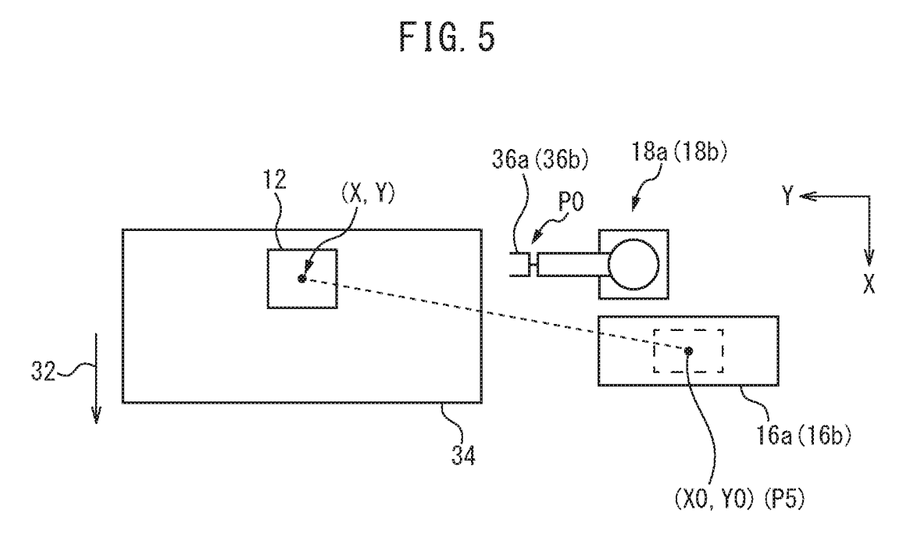
FIG. 5 is a plan view showing the positional relationship between a workpiece and a workpiece conveying position on a conveyor.
Figure 6:
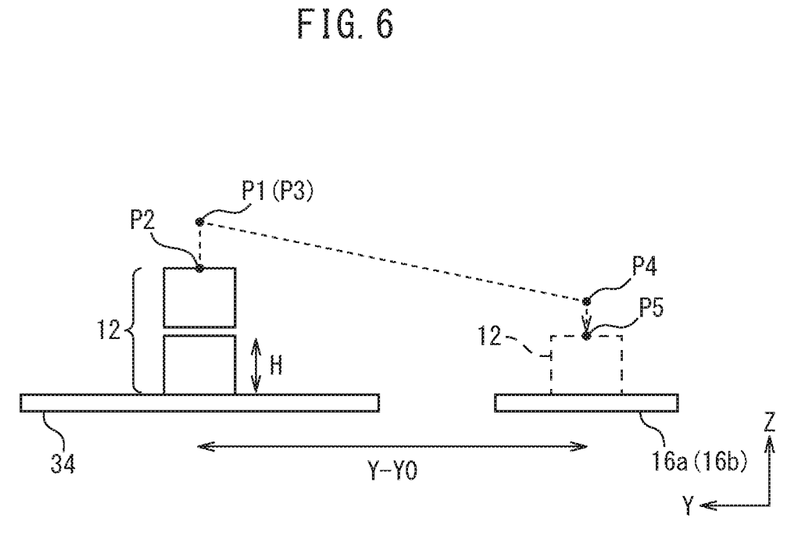
FIG. 6 is a side view showing the positional relationship between the workpiece and the workpiece conveying position on the conveyor.

FIGS. 5 and 6 are a plan view and a side view, respectively, showing the positional relationship between the workpiece 12 on the conveyor 34 and the workpiece conveying position 16a (16b). Here, it is assumed that a hand 36a or 36b whose position is represented as a representative point (e.g., a tool center point) of the robot 18a or 18b moves from its initial position P0 to a workpiece gripping position P2 via a workpiece approach position P1 just above the workpiece 12 to be conveyed to grip the workpiece 12, and moves to a conveying position P5 where the workpiece 12 can be placed on the conveying location 16a or 16b, via a retracted position P3 (generally coincident with P1) and a conveying approach position P4 just above the conveying location 16a or 16b.

Here, taking P3 to P4, which have the longest hand movement distance among P0 to P5, as an example, the moving distance L1 of the workpiece in the upper stage and the moving distance L2 of the workpieces in the lower stage can be expressed by the following formulas (1) and (2), respectively. It is assumed that the workpiece moves linearly from P3 to P4, and H is the height of each workpiece.

$$L1=\sqrt{((X-X0)^2+(Y-Y0)^2+H^2)} \quad (1)$$

$$L2=\sqrt{((X-X0)^2+(Y-Y0)^2)} \quad (2)$$

As described above, the robot 18*a* on the upstream side can grip and convey a workpiece whose X coordinate is in the range of Xa to Xb. Here, when the robot 18*a* conveys a plurality of workpieces, the first workpiece shall be grasped and conveyed when its X coordinate is Xa, and the last workpiece shall be grasped and conveyed when its X coordinate is Xb. Furthermore, when the robot 18*a* conveys three or more workpieces, if the number is k, the workpiece other than the first and last workpieces can be grasped and conveyed by the robot 18*a* when its X coordinate becomes a value represented by the following formula (3). In formula (3), i=1, 2, . . . , k−2.

$$X=Xa+(Xb-Xa)/(k-1) \times i \quad (3)$$

From the above formula (3), etc., an estimated value of the moving distance of the movable part (here, the hand attached to the tip of the arm) or the workpiece conveying distance when each workpiece is conveyed can be calculated as the movement amount of the movable part. The same applies to the robot 18*b*.

Next, in step S54, from among all the distribution patterns obtained in step S53, the distribution pattern in which the difference between the movement amount of the movable part of the robot 19*a* and the movement amount of the movable part, of the robot 18*b* is minimal or less than a predetermined value is selected and determined as the distribution pattern when actually conveying the workpiece. The movement amount as used herein represents the total value of the movement amount when the same movable part conveys a plurality of workpieces sequentially, assuming that each workpiece is conveyed. Thus, when conveying n workpieces, the distribution pattern in which the burden of each robot is averaged can be automatically obtained. The above predetermined value can be determined empirically in consideration of, for example, a maintenance frequency of a movable part such as a robot arm.

Referring again to FIG. 3, in step S6, in the area detected by the sensor 14, the presence or absence of a workpiece for which the robot to be used is already determined but which is not actually conveyed by the robot is determined, if there are no such workpieces, the process returns to step S4, and if there is such a workpiece, the workpiece is conveyed according to the determined distribution pattern (step S7). The processes of steps S4 to S7 are executed when the sensor 14 newly detects a workpiece to be conveyed.

Figure 7:
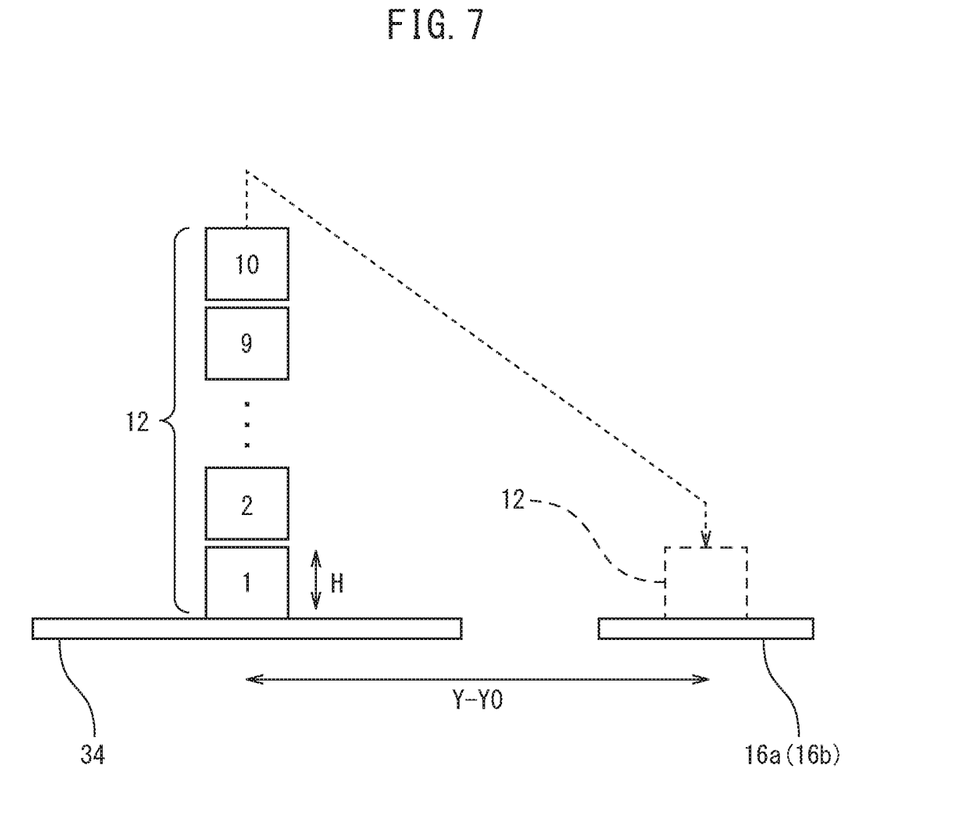
FIG. 7 is a diagram showing an example in which ten workpieces are stacked.

In the embodiment described above, the case where workpieces are stacked in two stages has been described, but the same process can be applied even when workpieces are stacked in three or more stages. For example, as shown in FIG. 7, the case in which workpieces 12 are stacked in ten stages, the height K of each workpiece is 100 mm, and the horizontal distance (Y−Y0) from the placement position of the workpiece on the conveyor to the workpiece conveying position is 500 mm will be considered.

Conventionally, in order to average the loads of each robot, first equalizing the number of workpieces conveyed by each robot has been considered. However, in the case of FIG. 7, assuming that the two robots each convey five workpieces (specifically, the five upper workpieces by the robot 18*a*, and the five lower workpieces by the robot 18*b*), the conveying distance La of the movable part of the robot 18*a* and the conveying distance Lb of the movable part of the robot 18*b* conform to the following formulas (4) and (5) (the unit is mm), respectively, whereby it can be seen that the load of the robot 18*a* is considerably greater than that of the robot 18*b*.

$$La=1030+943+860+781+707=4321 \quad (4)$$

$$Lb=640+583+539+510+500=2772 \quad (5)$$

Therefore, when the present embodiment is adopted, the distribution pattern is automatically determined such that the robot 18*a* conveys the four upper workpieces, and the robot 18*b* conveys the six lower workpieces. In this case, the conveyance distance La' of the movable part of the robot 18*a* and the conveyance distance Lb' of the movable part of the robot 18*b* becomes as shown in the following formula (6) and (7) (the unit is mm), respectively, whereby it can be seen that the movement amounts of both robots are averaged.

$$La'=1030+943+860+781=3614 \quad (6)$$

$$Lb'=707+640+583+539+510+500=3479 \quad (7)$$

Therefore, in the present embodiment, even in a state where a plurality of workpieces are stacked, it is possible to average the loads of the robots when transporting these workpieces. By thus determining the distribution pattern of the workpieces by utilizing the three-dimensional positions of the workpieces (in particular height information), it is possible to substantially equalize the maintenance frequency, etc., between the robots, whereby maintenance and management of the transport system as a whole is also facilitated. Further, as in the present embodiment, when a plurality of workpieces are conveyed at a predetermined velocity by a conveyor, etc., it is necessary to finish conveying all the workpieces to the conveying destination within a predetermined time, and since the movement amounts of the robots are averaged in this embodiment, the conveying time required of each robot can also be averaged.

In the above-described example, the movement distance of the movable part of each robot from P0 to P5 is obtained as the movement distance. However, even if the movement distance is the same, the load applied to the robot is larger when the robot is gripping a workpiece than when the robot is not gripping a workpiece. Therefore, for example, the movement distance of the movable part of the robot may be calculated only for the routes P2 to P5 in which the robot holds the workpiece, and the distance of the paths P2 to P5 (i.e., the conveying distance of the workpiece) may be used as the movement amount of the movable part. Alternatively, the paths P2 to P5 in which the robot holds the workpiece and the paths P0 to P2 in which the robot does not hold the workpiece may be weighted differently (specifically, the latter is lighter) and the sum thereof may be calculated, and the obtained total value may be used as the movement amount of each movable part.

Though the movement distance of the movable part (workpiece) is used as the movement amount of the movable part of the robot in the example described above, from the viewpoint of the maintenance frequency of the robot, it may be preferable to use the cumulative rotation angle of at least one of robot axes for driving the movable parts as the movement amount of the movable part. Hereinafter, a specific example thereof will be described.

In the movement path of the hand to P3 to P4 described above, if the rotation angle position of the axis for driving the hand (in this case, J1 axis) is changed to (−35°→+120°→+10°), the movement amount of J1 axis (cumulative rotation angle amount) is 265° (=155°+110°). It is assumed that between −35°→+120° and +120°→+10°, the rotational angular position changes monotonously (monotonically increasing or monotonically decreasing).

Generally, while the rotation angle position of each axis of the robot changes from X0 to X, assuming that the number of times the rotation angle position changes from increase to decrease or from decrease to increase is n times, if the angles at which the change from increase to decrease or decrease to increase is X1, X2, . . . Xn, the cumulative rotation angle (movement amount) D of each axis can be expressed by the following formula (8). In formula (8), k=1, 2, . . . , n. Note that the rotation angle position of each axis may be obtained from the detection value of an encoder (not illustrated), etc., provided on each shaft, and may be obtained from the command value included in the operation command sent from the robot controller to each robot.

$$D = \Sigma(|X_k - X_{k-1}|) \qquad (8)$$

The optimal distribution pattern can be selected and determined by calculating the movement amount (cumulative rotation angle) of the axis of each robot for each distribution pattern using formula (8). As the movement amount of the axis, the movement amount of only a specific axis (e.g., J1 axis) among the axes for driving the movable part in each robot may be used, or the total value of the movement amounts of all of the axes (e.g., J1 to J6 axes) related to the driving of the movable parts may be used. In addition, if the labor and cost of maintenance differ significantly between J1 to J6 axes, the sum value may be obtained after a predetermined weight is given to the movement, amount of each axis, and the sum value may be used as the movement amount for determining the optimum distribution pattern. The use of the movement amounts of the respective axes in this manner is also applicable to the second embodiment and the third embodiment, which will be described later.

Second Embodiment

Figure 8:
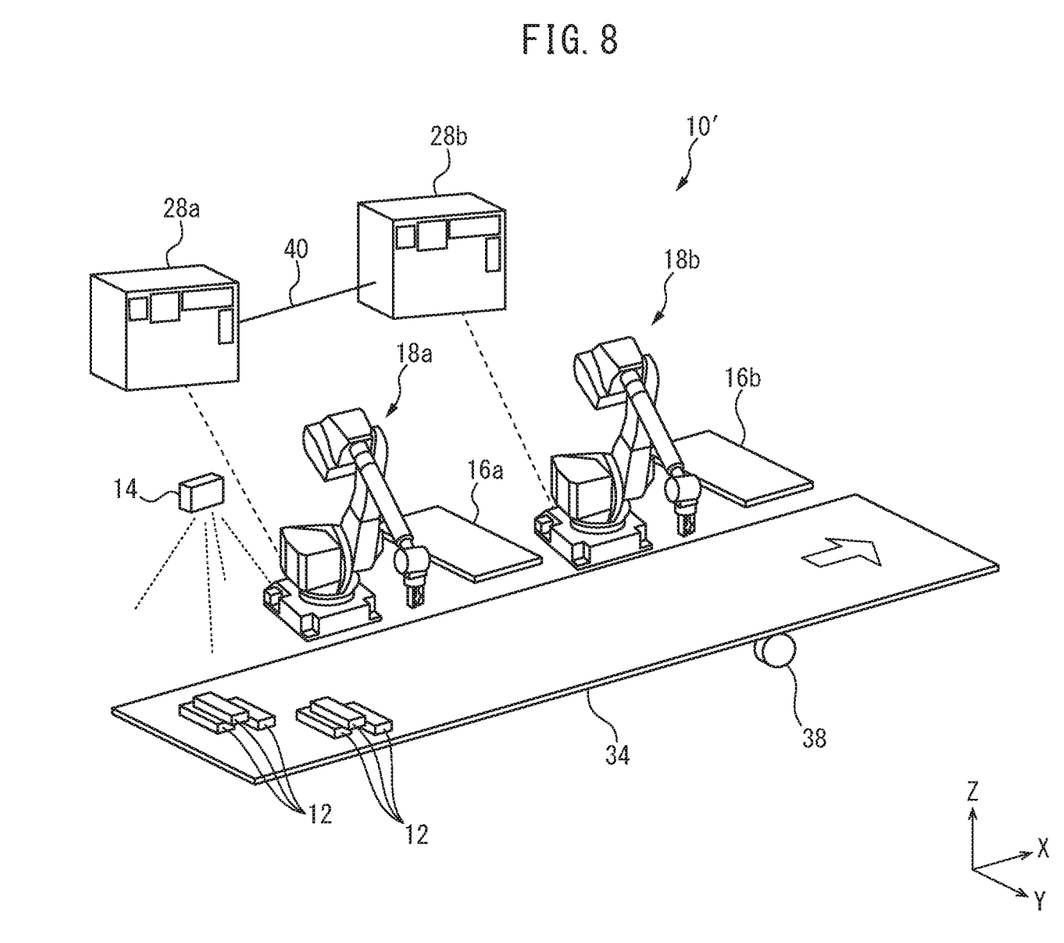
FIG. 8 is a diagram showing a configuration of an article transport system according to a second embodiment.

FIG. 8 is a diagram showing an example of a basic configuration of an article transport system 10' according to a second embodiment. The second embodiment differs from the first embodiment only in the number of control sections, and other components and processes may be the same as those of the first embodiment. While a plurality of robots are controlled by substantially one controller in the first embodiment, the article transport system 10' has a control section (robot controller 28a) for controlling the robot 18a and a control section (robot controller 28b) for controlling the robot 18b, the robot controllers 28a and 28b are communicatively connected to each other by Ethernet™ 40, etc.

In the second embodiment, the controller 28a for controlling the upstream robot 18a performs processing of the controller 28 of the first embodiment to determine the optimal distribution pattern. Thereafter, the controller 28a sends a command to the robot 18a to pick up the workpiece to be transferred by the robot 18a and transfer the workpiece to the pallet 16a based on the determined distribution pattern, and information regarding workpieces not to be transported by the robot 18a (i.e., to be transported by the robot 18b) is transmitted to the controller 28b of the robot 18b. Thus, the controller 28b may control the robot 18b based on the information from the controller 28a.

In the second embodiment, the number of control sections is greater than in the first embodiment, which is somewhat disadvantageous in terms of the cost of the entire article transport system. However, generally, the number of robots that can be controlled by one control section has an upper limit, and it may be difficult for one control section to perform arithmetic processing in the present disclosure because of the performance of the CPU, etc. In such a case, it is preferable to provide a control section in each robot, as in the second embodiment.

Third Embodiment

The configuration of the article transport system of the third embodiment may be the same as in the first or the second embodiment, but the process for determining the optimum distribution pattern is different from the first or the second embodiment. Hereinafter, a specific example thereof will be described with reference to the flowchart of FIG. 9.

Figure 9:
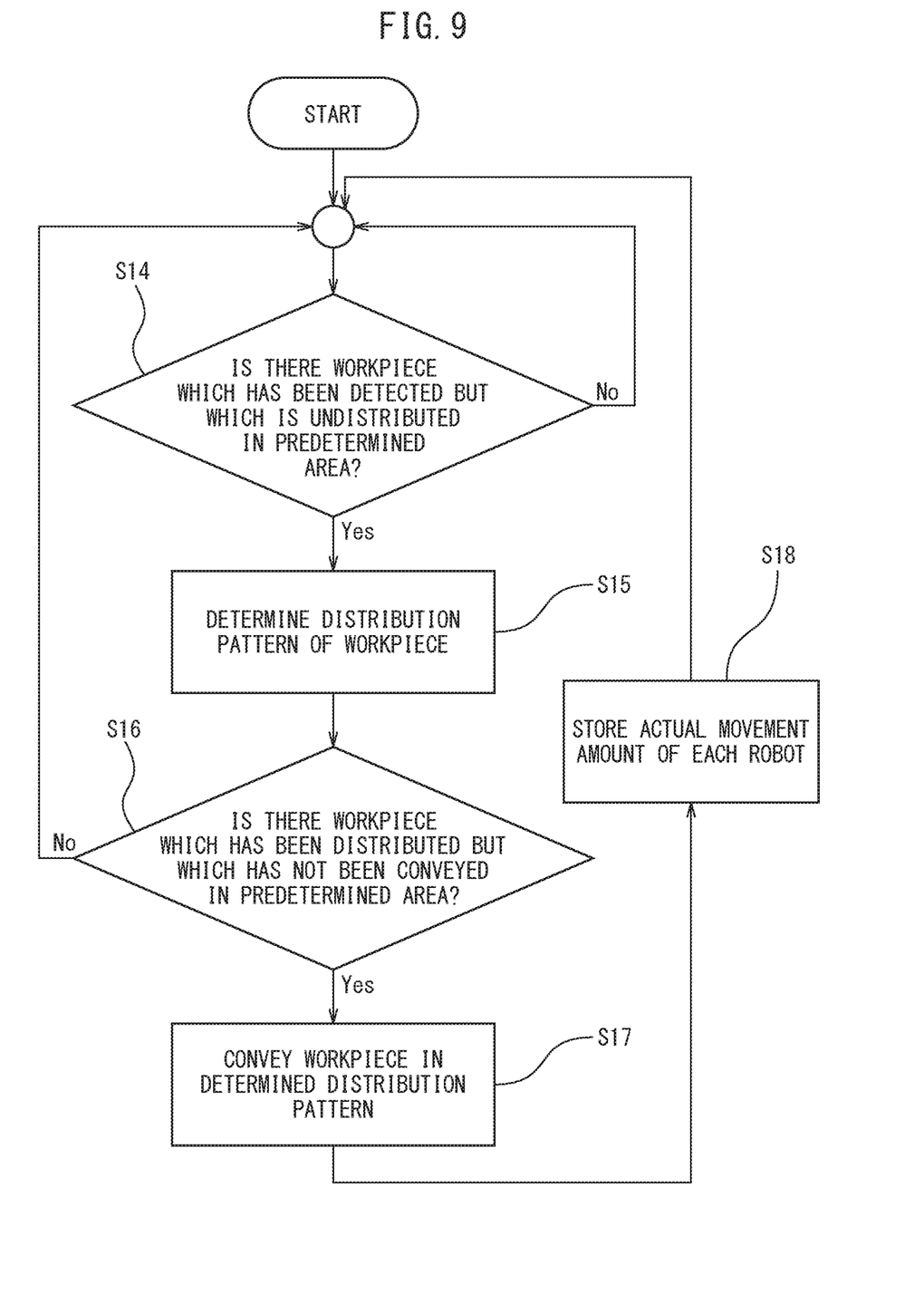
FIG. 9 is a flowchart showing distribution and conveyance process of a third embodiment.

Steps S14 to S17 in the flowchart of FIG. 9 may be identical to steps S4 to S7, respectively, of the flowchart of FIG. 3. However, FIG. 9 differs from the flowchart of FIG. 3 in that after step S17, step S18 in which the actual, movement amount (the movement distance of the movable part, the movement amount of each axis, etc.) of each robot is stored in the storage section 30 (see FIG. 1) is included.

Figure 10:
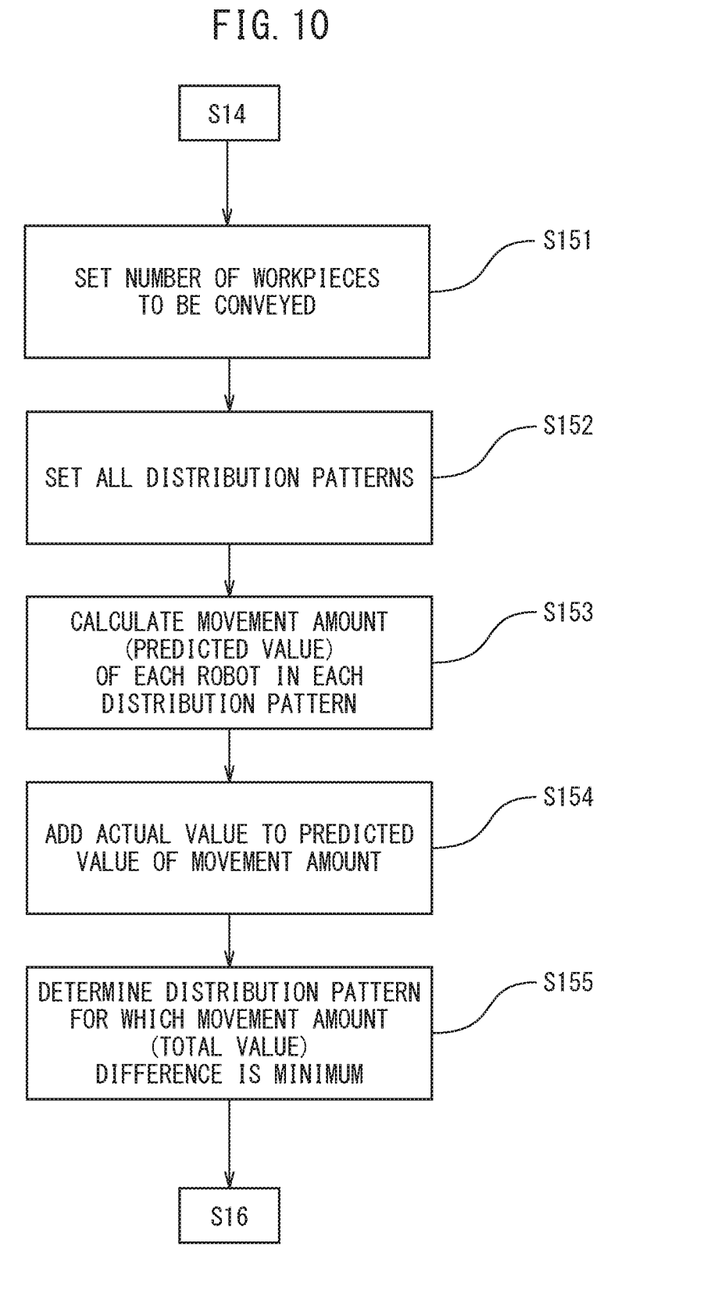
FIG. 10 is a flowchart showing distribution pattern determination process of the flowchart of FIG. 9.

Next, the details of the process S15 for determining the optimum distribution pattern will be described with reference to the flowchart of FIG. 10. Steps S151 to S153 may be identical to steps S51 to S53, respectively, of the flowchart of FIG. 4, but the movement amount, of each robot calculated in S53 in FIG. 4 can be said to be the predicted movement amount of each robot.

Therefore, in the next step S154, the actual value of the movement amount of each robot stored in step S18 is added to the predicted value calculated in step S153.

As shown in FIG. 1, the third embodiment can be suitably applied to a case where there are a plurality of clusters of n workpieces. In other words, the movement amount of each of the robots 18a and 18 when one cluster of the n workpieces is conveyed is stored as the actual value (S18), and the predicted movement amount of each robot when the next cluster of n workpieces is conveyed is calculated (S151 to S153). This calculation may be the same as in the first embodiment.

Next, by adding the predicted value to the actual value for each robot (S154), and selecting and determining a distribution pattern in which the difference in the sum value is minimal or less than a predetermined value as an optimal solution (S155), it is possible to obtain a distribution pattern in which the loads of each robot, are more uniform than when only the predicted value is used.

As an application example, for example, when the third embodiment, is applied to a case where a plurality of work groups are conveyed by a conveyor with 10-stage stacked workpieces as one workpiece group, as shown in FIG. 7, the following effects can be obtained.

As described above, in the case of only one workpiece group, the pattern in which the robot 18a conveys the upper four workpieces and the robot 18b conveys the lower six workpieces is selected as the optimum distribution pattern. However, as can be seen from formulas (6) and (7), the movement distances of both robots are not exactly the same, and there is a certain difference (135 mm here). Therefore, if this distribution pattern is repeated, the distance between the cumulative movement distances of the robots will gradually increase.

Here, when the third embodiment is adopted, since the past actual value is considered for the movement amount of each robot, for some of the plurality of workpiece groups, a pattern in which the robot 18a conveys the upper three workpieces and the robot 18b conveys the lower seven workpieces will be selected as the optimum distribution pattern. Thus, in the third embodiment, the movement distance (load) of each robot can be averaged with a higher accuracy.

The embodiments described above may be combined as appropriate. For example, the arithmetic processing of the third embodiment may be performed in the configuration of the second embodiment, the workpiece to be conveyed by the robot 18a on the upstream side may be determined based on the sum value of the actual value and the predicted value of the movement amount of the movable part of the robot 18a, and further, the information of workpieces not conveyed by the robot 18a can be transmitted from the robot controller 28a to the robot controller 28b.

In any of the above-described embodiments, it is preferable that the movement path of the movable part of the robot be set so as to avoid interference with other workpieces, peripheral objects, etc. It should be noted that a well-known technique can be adopted as the means and method for obtaining the conveyance path for avoiding interference, and therefore a detailed description thereof will be omitted.

According to the present disclosure, since the movement amounts of the movable parts are averaged, the loads of the movable parts are also distributed and averaged. Therefore, it is possible to equalize the timings and intervals of maintenance of the movable parts, whereby maintenance and management of the transport system as a whole is facilitated.

While the invention has been described with reference to specific embodiments chosen for the purpose of illustration, it should be apparent that numerous modifications could be made thereto, by a person skilled in the art, without departing from the basic concept, and scope of the invention.

The invention claimed is:

1. An article transport system comprising:
    a sensor configured to detect a three-dimensional position of each of a plurality of articles,
    a robot having a plurality of movable parts configured to convey the articles to a predetermined conveying position,
    a processor comprising a plurality of sections, including:
    a control section configured to control the robot,
    a movement amount calculation section configured to calculate a movement amount of each of the plurality of movable parts when each of the plurality of articles is conveyed by any one of the plurality of movable parts based on the three-dimensional position of each of the plurality of articles, and
    a distribution determination section configured to determine a distribution pattern regarding which of the plurality of movable parts is used to convey each of the plurality of articles so that a difference between movement amounts of each of the plurality of the movable parts is lower than a predetermined value.

2. The article transport system according to claim 1, wherein the movement amount calculation section calculates a cumulative rotation angle of at least one of axes for driving the plurality of movable parts as the movement amount of the plurality of movable parts.

3. The article transport system according to claim 1, wherein the movement amount calculation section calculates a conveying distance of an article conveyed by the movable part as the movement amount of the plurality of movable parts.

4. The article transport system according to claim 1, wherein the processor further comprises a storage section for storing an actual value of the movement amount of each of the plurality of movable parts, wherein
    the distribution determination section determines the distribution pattern using a value obtained by adding the movement amount calculated by the movement amount calculation section to the actual value stored in the storage section for each of the plurality of movable parts.

5. The article transport system according to claim 1, further comprising a conveyor for conveying the plurality of articles in a predetermined conveying direction at a predetermined conveying velocity.

6. The article transport system according to claim 1, wherein the processor further comprises a plurality of control sections configured to control the plurality of movable parts.

7. The article transport system according to claim 1, wherein the sensor detects the three-dimensional position and posture of the measurement object by measuring and acquiring information regarding the X, Y, and Z coordinates of the measurement object.

8. An article transport system comprising:
    a sensor configured to detect a three-dimensional position of each of a plurality of articles,
    a robot having a plurality of movable parts configured to convey the articles to a predetermined conveying position,
    a processor comprising a plurality of sections, including:
    a control section configured to control the robot,
    a movement amount calculation section configured to calculate a movement amount of each of the plurality of movable parts when each of the plurality of articles is conveyed by any one of the plurality of movable parts based on the three-dimensional position of each of the plurality of articles, and
    a distribution determination section configured to calculate a plurality of distribution patterns and determine a distribution pattern from the plurality of distribution patterns regarding which of the plurality of movable parts is used to convey each of the plurality of articles so that a difference between the movement amounts of each of the plurality of the movable parts is minimal.

\* \* \* \* \*